United States Patent
Palfenier et al.

(10) Patent No.: US 6,832,661 B2
(45) Date of Patent: Dec. 21, 2004

(54) DELASHING MECHANISM FOR FIXED PARALLEL BASED GEAR PAIRS

(75) Inventors: Samuel Roland Palfenier, El Paso, TX (US); Mario A. Recio, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/372,186

(22) Filed: Feb. 21, 2003

(65) Prior Publication Data

US 2004/0163878 A1 Aug. 26, 2004

(51) Int. Cl.$^7$ .................................................. B62D 5/04
(52) U.S. Cl. ............. 180/444; 73/862.335; 74/388 PS; 74/409; 74/423; 74/440
(58) Field of Search ........................ 73/855, 862.335, 73/862.336, 862.46, 862.69; 180/444, 443; 74/63, 409, 411, 413, 423, 440, 388 PS

(56) References Cited

U.S. PATENT DOCUMENTS

| | | | |
|---|---|---|---|
| 4,524,643 A | * 6/1985 | Ziegler et al. | ............... 475/345 |
| 4,885,959 A | * 12/1989 | Shinjo et al. | ............... 475/347 |
| 6,354,395 B1 | 3/2002 | Cheng et al. | |
| 6,408,707 B1 | * 6/2002 | Kimura et al. | ................. 74/409 |
| 6,523,431 B2 | 2/2003 | Ozsoylu et al. | |
| 6,557,425 B2 | * 5/2003 | Kamiya et al. | ........ 73/862.334 |

FOREIGN PATENT DOCUMENTS

| | | | |
|---|---|---|---|
| GB | 2244538 | * | 4/1991 |
| JP | 60-234170 | * | 11/1985 |

* cited by examiner

Primary Examiner—Anne Marie Boehler
(74) Attorney, Agent, or Firm—Jimmy L. Funke

(57) ABSTRACT

A mechanism for de-lashing a gear assembly includes a first gear rotatable about a first axis and a first center rotatably fixed to the first axis and a first conical teeth portion. The gear assembly includes a second gear rotatable about a second axis and a second center rotatably fixed to said second axis and a second conical teeth portion configured to meshingly engage first conical teeth portion when the first and second gears are aligned substantially coplanarly. A biasing means operably biases the second conical teeth portion of the second gear against the first conical teeth portion of the first gear to reduce any lash therebetween. The biasing means is configured to bias the second gear in an axial direction while maintaining a fixed center distance between the first and second axes. The first gear is rotatably fixed about the fixed first axis such that the first gear is prevented from translation along the fixed first axis.

15 Claims, 3 Drawing Sheets

DELASHING MECHANISM FOR FIXED PARALLEL BASED GEAR PAIRS

TECHNICAL FIELD

This invention relates generally to a gear configuration having a fixed center distance between parallel gears to eliminate backlash, and more particularly, to elimination of the lack of movement in a driven gear in the event of a change in rotational direction of the driver gear.

BACKGROUND OF THE INVENTION

In the prior art, gear set assemblies involved in transmitting angular movement from one shaft to another generally accommodate a relatively large tolerance to lash intrinsic with fabrication, and assembly of such gear set assemblies. In any gear set, backlash, or clearance between a tooth of one of the gears as it fills the space between two teeth of another gear, is necessary in the meshed engagement of the teeth of a gear in order to permit relative motion between two gears. In a gear system with no backlash, the meshing of the teeth between gears will be so tight that, absence any deflection of the teeth, the gears will bind and cause the system to jam.

Various attempts to de-lash a gear system are well known in the prior art. The de-lashing of non-fixed parallel gear sets by adjusting the center distance between the gears is well understood and is usually accomplished using a spring or screw-type adjustment. These methods are generally effective through a very narrow range of manufacturing variability. More specifically, some attempts at so-called "active de-lashing" exist using the same shaped parallel gears and a spring to make the apparent tooth width bigger that accomplishes both lash control and fixed center distance. However, the de-lash is not suitable when using a spring having a low spring rate and rotation of the final gear assembly is difficult when using a spring having a high spring rate. A hand-wheel position sensor is one implementation requiring a pair of gears having a fixed center distance while zero backlash is recommended.

Thus, there remains a need to control backlash for rotating gears having a fixed center distance from each other while meshingly engaged in substantially the same plane.

SUMMARY OF THE INVENTION

A mechanism for de-lashing a gear assembly includes a first gear rotatable about a first axis having a first center rotatably fixed to the first axis and a first conical teeth portion. The gear assembly includes a second gear rotatable about a second axis having a second center rotatably fixed to said second axis and a second conical teeth portion configured to meshingly engage first conical teeth portion when the first and second gears are aligned substantially coplanarly. A biasing means operably biases the second conical teeth portion of the second gear against the first conical teeth portion of the first gear to reduce any lash therebetween. The biasing means is configured to bias the second gear in an axial direction while maintaining a fixed center distance between the first and second axes. The first gear is rotatably fixed about the fixed first axis such that the first gear is prevented from translation along the fixed first axis.

In one embodiment, the de-lashing gear assembly is employed with a hand-wheel position sensor configured to sense the rotational position of a motor vehicle hand-wheel. The hand-wheel position sensor includes a housing; a PCB disposed within said housing; a sensor operably connected to circuitry on said PCB; and a gear assembly operably connected to the sensor having a mechanism for de-lashing the gear assembly. The gear assembly includes a first gear rotatable about a first axis having a first center rotatably fixed to the first axis and a first conical teeth portion. The gear assembly includes a second gear rotatable about a second axis having a second center rotatably fixed to said second axis and a second conical teeth portion configured to meshingly engage first conical teeth portion when the first and second gears are aligned substantially coplanarly. A biasing means operably biases the second conical teeth portion of the second gear against the first conical teeth portion of the first gear to reduce any lash therebetween. The biasing means is configured to bias the second gear in an axial direction while maintaining a fixed center distance between the first and second axes. The first gear is rotatably fixed about the fixed first axis such that the first gear is prevented from translation along the fixed first axis.

The above-described and other features and advantages of the present invention will be appreciated and understood by those skilled in the art from the following detailed description, drawings, and appended claims.

BRIEF DESCRIPTION OF THE DRAWINGS

Referring now to the Figures wherein like elements are numbered alike.

DETAILED DESCRIPTION OF THE INVENTION

Figure 1:
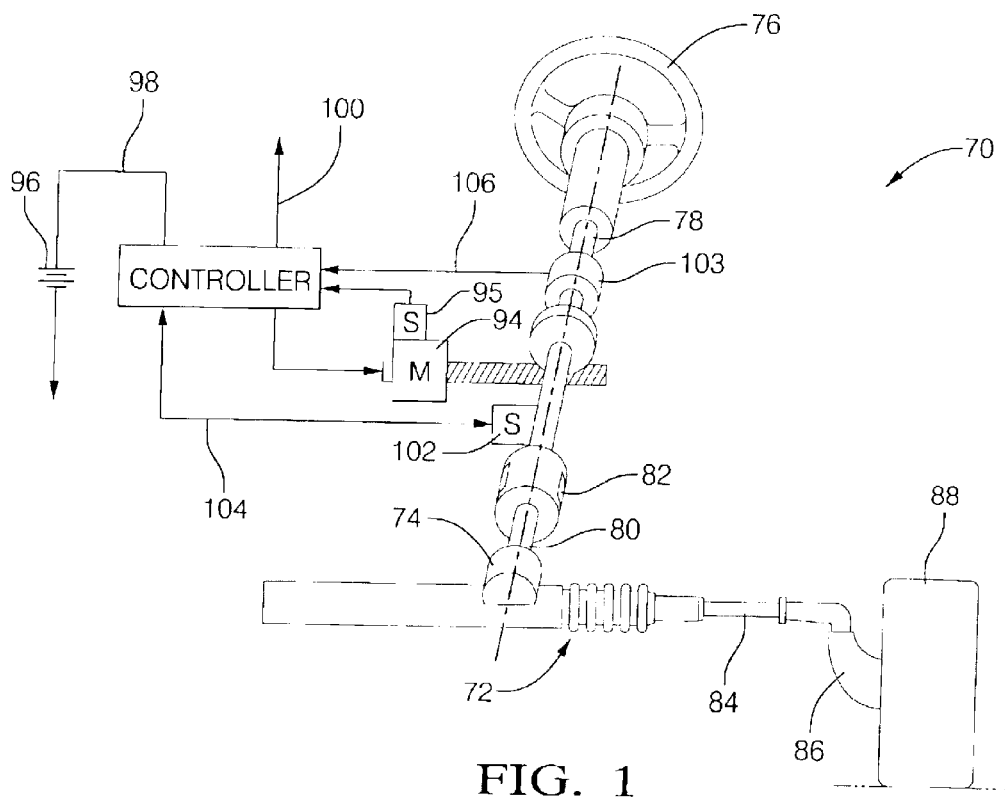
FIG. 1 is a schematic diagram of an electric power steering system having a hand-wheel position sensor in communication with a controller.

Referring to FIG. 1, reference numeral 70 generally designates an Electric Power Steering ("EPS") system for a motor vehicle. In an EPS system, it may be desirable to provide the absolute hand-wheel position using a handwheel position sensor. This position may be used, for example, to cause the hand-wheel to return to center following a steering input.

Still referring to FIG. 1, a steering mechanism 72 is a rack-and-pinion type mechanism that includes a toothed rack (not shown) and a pinion gear (also not shown) located under a gear housing 74. A steering wheel 76 is coupled to an upper steering shaft 78. As the steering wheel 76 is turned, the upper steering shaft 78, which is connected to a lower steering shaft 80 through a universal joint 82, turns the pinion gear. Rotation of the pinion gear moves the toothed rack, which moves tie rods 84 (only one shown) that, in turn, move steering knuckles 86 (only one shown), which turn wheels 88 (only one shown). EPS assist torque is provided through an assist unit generally designated by reference numeral 90, which includes a controller 92 and an electric motor 94. A motor position commutation sensor 95 measures the relative position of the motor 94. The controller 92 is powered by a vehicle power supply 96 through a supply line 98. The controller 92 receives a signal indicative of the vehicle velocity on signal line 100. Initial hand-wheel position is measured by hand-wheel position sensor 102 and fed to the controller 92 through line 104. Position sensor 102 may be an optical-encoding type of sensor, a variable resistance type of sensor, or any other suitable type of position sensor for performing the functions of the hand-wheel position sensor 102. In an exemplary embodiment, hand-wheel position sensor 102 includes a pairs of gears (not shown) rotating with a fixed center distance with respect to one another where zero lash is desirable. Hand-wheel 76 rotates shaft 78 which moves a large driving gear having a large magnet attached thereto. The large driving gear, in turn, operably engages a small driven gear having a small magnet attached to it. The large driving gear and the small driven gear are depicted as 118 and 120 in FIG. 2.

The large magnet creates a magnetic field that is detected and converted into a signal. The small magnet also creates its own magnetic field, and it is also converted into a signal. The two fields are isolated from each other. A microcontroller 92 combines the two signals (the large magnetic field direction and the small magnetic field direction) into one and calculates the shaft rotational position in a 5-turn range. It will be noted that although hand-wheel position sensor 102 is disclosed in conjunction with EPS system 70, other steering systems using operator steering input from a hand-wheel is contemplated to use hand-wheel position sensor 102.

Figure 2:
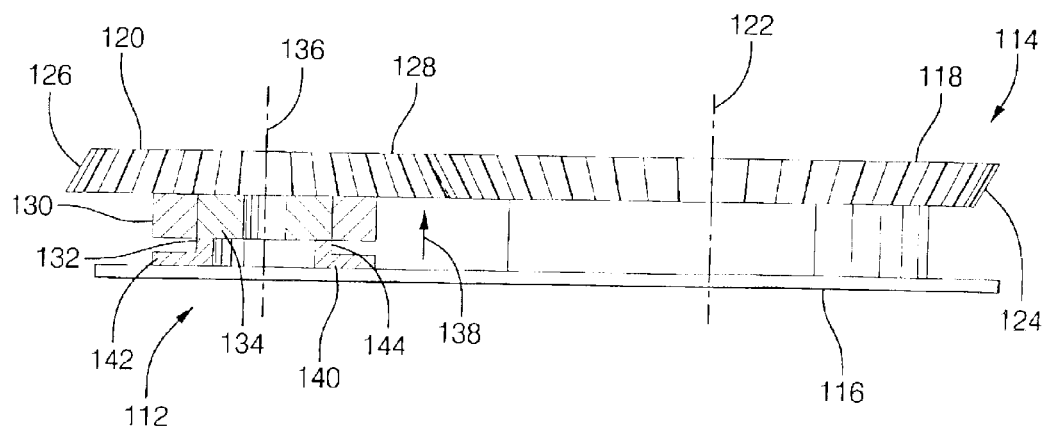
FIG. 2 is a partial cross section side elevated view of an exemplary embodiment of a taper based de-lashing mechanism used in the hand-wheel position sensor of FIG. 1.

Referring now to FIG. 2, an exemplary embodiment of a hand-wheel position sensor subassembly 112 is shown. Subassembly 112 includes a pair of conical gears substantially coplanar and meshingly engaged illustrated generally at 114. Conical gears 114 extend axially from a printed circuit board ("PCB") on which conical gears 114 are operably connected. PCB 116 is operably disposed with hand-wheel position sensor 102.

In an exemplary embodiment, conical gears 114 include a vertically fixed gear 118 and a biased gear 120 that is smaller than gear 118 as illustrated. It will be recognized that gear 120 may, in alternative embodiments, be the same size or larger than gear 118, however. Gear 118 is vertically fixed in relation to PCB 116 and axially rotatable about axis 122. Gear 118 includes conical teeth 124 that taper inwardly toward axis 122 extending form PCB 116. Conical teeth 122 meshingly engage with complementary configured conical teeth 126 defining gear 120. Conical teeth 126 of gear 120 taper outwardly from a top portion 128 of gear 120.

Gear 120 includes a hub portion 130 defining a bore 132 for disposing a bearing 134 therein. Bearing 134 allows gear 120 to rotate about an axis 136. Axis 136 optionally includes a shaft (not shown) extending through a bore defined by bearing 134. Gear 120 is biased in a direction indicated by arrow 138 that effectively reduces the lash caused by meshing engagement between conical teeth 124, 126 of gears 118, 120, respectively. Gear 120 is biased in direction 138 via a spring washer 140 that has a base portion 142 disposed on PCB 116 and a biasing means 144 extending from base portion 142 urging bearing 134 in direction 138. It will be recognized by one skilled in the pertinent art that outwardly tapered conical teeth 126 engage inwardly tapered conical teeth 124 of gear 118, relative to viewing from the top down as illustrated, prevent further vertical translation of gear 120 while providing de-lashing between the two gears 118, 120.

Figure 3:
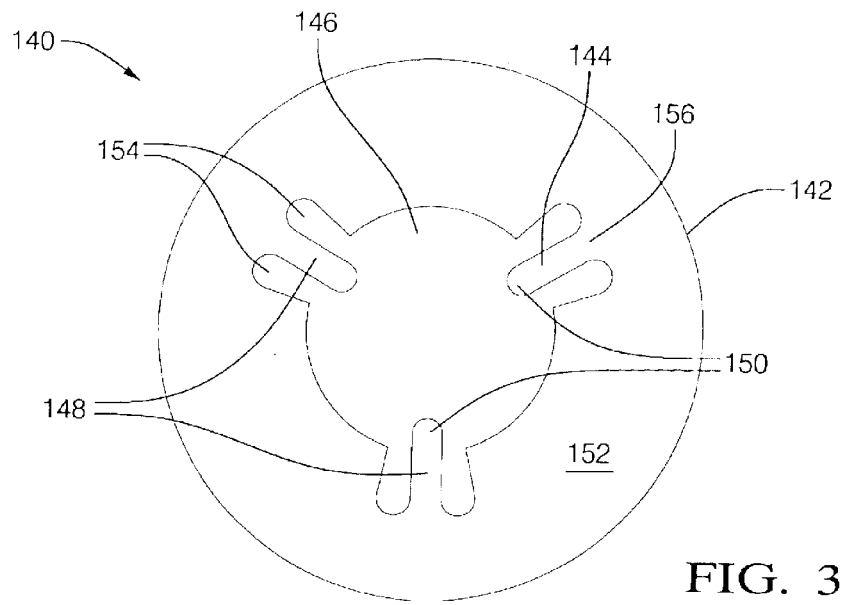
FIG. 3 is a top plan view of an exemplary spring washer for use with the taper based de-lashing mechanism of FIG. 2.

Referring to FIG. 3, an exemplary embodiment of spring washer 140 is illustrated. Spring washer 140 includes base portion 142 configured as a flat disk washer having an aperture 146 configured to allow passage of a shaft (not shown) therethrough. Gear 120 or bearing 134 or both may include a shaft extending therethrough for transmitting or receiving angular movement of gear 120. In one exemplary embodiment shown, biasing means 144 include three equidistant prongs 148 extending radially inwardly from base portion 142. Prongs 148 are configured as not being coplanar with base surface 142 for providing a biasing force when prongs 148 are urged to be coplanar with base surface 142. More specifically, an end portion 150 of each prong 148 extends from a top surface 152 defining base portion 142 and contacts a bottom surface of bearing 134. In this manner, end portion 150 provides a bias in direction 138 against bearing 134, and thus, against gear 120.

In an exemplary embodiment, aperture 146 is defined substantially by a circular shape having prongs 148 extending into the defined circular shape. It will be recognized by one skilled in the pertinent art that aperture 146 is further defined on either side of each prong 148 with a cutout 154 in base portion 142 to facilitate bending of each prong while reducing stress at a junction where a bottom portion 156 of each prong joins with base portion 142. Washer 140 is preferably made of a non-magnetic material for use with an Absolute Hand-wheel Position Sensor (AHPS) described with reference to FIG. 1.

It is also contemplated that non-magnetic stainless steel, as well as bronze and plastics can be used. For other applications where the magnetic properties are not a constraint, any material with enough elastic properties for reducing the distance between the gears is contemplated. It will be recognized that washer 140 or any other suitable device should exert enough force to reduce the distance between the "conical" surfaces of the small gear teeth and the large gear teeth and not so large that it would be impossible to rotate the gears or generate a permanent deformation on them.

Figure 4:
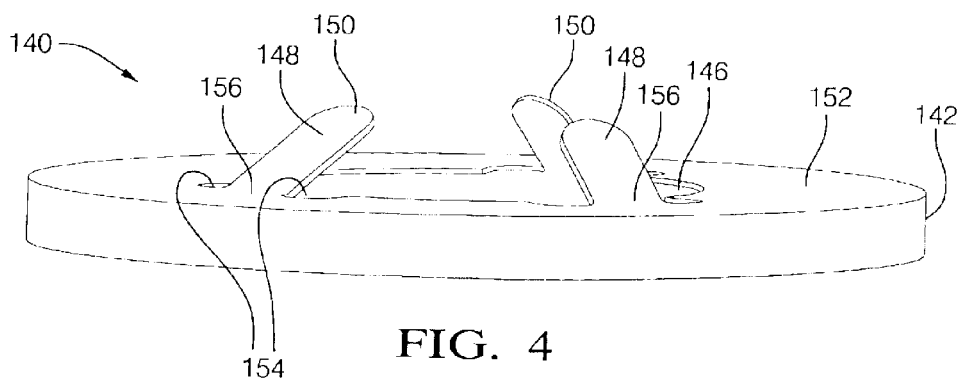
FIG. 4 is an enlarged perspective view of the spring washer of FIG. 3 illustrating biasing prongs extending therefrom.

FIG. 4 illustrates an enlarged perspective view of spring washer 140 shown in FIG. 3. Each prong 148 is a resilient biasing member configured to be partially compressed toward top surface 152 when spring washer 140 is disposed between bearing 134 and PCB 116. In this manner, prongs 148 bias conical teeth 126 of gear 120 toward conical teeth 124 of gear 118 to eliminate lash without adjustment of a center distance between the two gears. The center distance between the two gears 118, 120 is defined by a fixed distance between axis 122 and axis 136, as gears 118, 120 are rotatably fixed with respect to each axis 122 and 136, respectively (See FIGS. 2 and 5).

Figure 5:
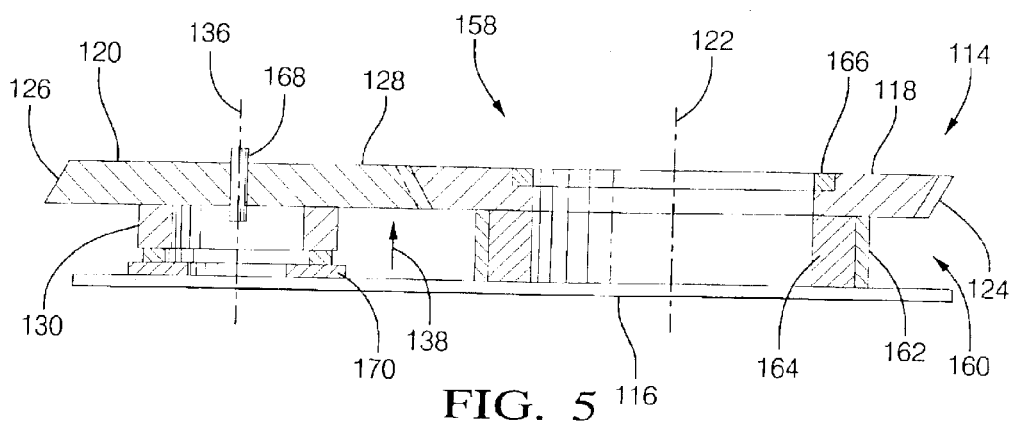
FIG. 5 is a cross section side elevated view of another exemplary embodiment of a taper based de-lashing mechanism.

Referring now to FIG. 5, an alternative embodiment of conical gears 114 is illustrated. More specifically, gear 118 is fixed vertically with respect to PCB 116 via bearing surfaces at an upper portion 158 and lower portion 160 of gear 118. A first bearing surface 162 is disposed around a hub portion 164 defining lower portion 160. A second bearing surface 166 resides in a cutout in upper portion 158 configured to receive second bearing surface 166.

Conical teeth 124 of gear 118 engage conical teeth 126 of gear 120 biased in a direction indicated by arrow 138. Gear 120 is rotatable and translatable about axis 136 while also being fixed relative thereto. A pin shaft 168 extends axially from top surface 128 of gear 120 to transmit angular movement thereto. Spring washer 140 is disposed between hub 130 of gear 120 and a bearing surface 170 operably connected to PCB 116. Spring washer 140 biases conical teeth 126 of gear 120 in direction 138 to optimize contact with complementary conical teeth 124 of gear 118. In this manner, lash is reduced between gears 118 and 120 having complementary tapered conical teeth that in effect alter the effective fixed center distance between them by vertical translation of one gear relative to the other without altering the actual fixed center distance defined by each respective rotational axis.

It will be noted that although spring washer has been described and illustrated having biasing means as three prongs 148, any number of prongs is contemplated. Alternatively and referring to FIG. 6, biasing means 144 optionally includes a single biasing member 172 extending from an edge 174 defining aperture 146. Biasing member 172 includes a hollow first frustocone 176 having a base 178 extending from edge 174. A hollow second frustocone 180 having a second base 182 extends toward base portion 142 from a first top edge 184 defining an opening 186 of first frustocone 176. Second hollow frustocone is an inverted hollow frustocone)with respect to first frustocone 176. A hollow third frustocone 188 having a third base 190 extends in the same direction of first frustocone 176 and from a second top edge 192 defining a second opening 194 of second frustocone 180. A third top edge 196 defines an aperture 246 for passage of a shaft (not shown) therethrough. Top edge 196 operatively provides biasing contact against a gear 120 for reducing the lash between meshing engagement of conical teeth 126 and 124 of gears 120 and 118, respectively. Biasing member 172 is configured to provide a biasing force in direction 138 when third frustocone 188 is compressed toward first frustocone 180. More specifically, top edge 196 of third frustocone 188 exerts a bias in direction 138 when third frustocone 188 is further disposed by compression thereof within first frustocone 176 via first opening 186 of first frustocone 176. It will be recognized that first, second and third frustocones 176, 180, and 188 are concentric with respect to one another.

Figure 6:
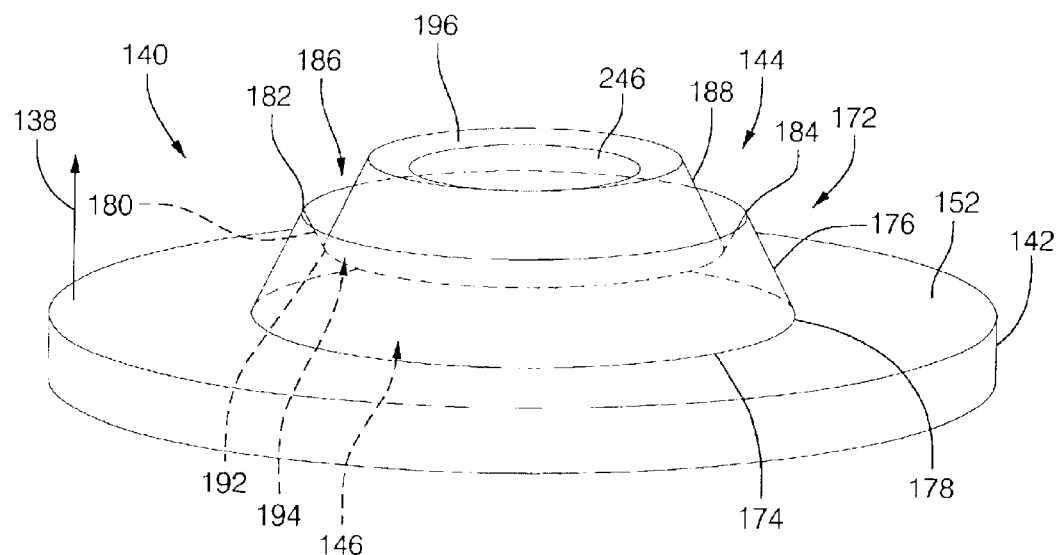
FIG. 6 is an enlarged perspective view illustrating an alternative embodiment of the spring washer of FIG. 4.

It will be further noted that an alternative embodiment to that shown in FIG. 6 optionally includes spring washer 140 having at least two hollow frustocones, wherein each frustocone is defined by a frustoconical wall defined by a top wall edge and a bottom wall edge. The bottom wall edge defines a bottom perimeter about second axis 136 larger than a top perimeter defining the top wall edge. Biasing means 144 urges second conical teeth portion 126 in a direction 138 urging the bottom wall edge of second conical teeth portion 126 toward facing first conical teeth portion 124 of first gear 118.

An alternative embodiment for a resilient biasing member includes at least a hollow first frustocone concentrically connected to a hollow second frustocone by connection of at least one of a top wall edge and a bottom wall edge defining each of the first and second frustcones. The first and second frustocones are contiguous and inverted with respect to each other. The contiguous frustocones are operably connected via a top wall edge of one of the first and second frustocones to a bottom wall edge of the other contiguous frustocone.

Figure 7:
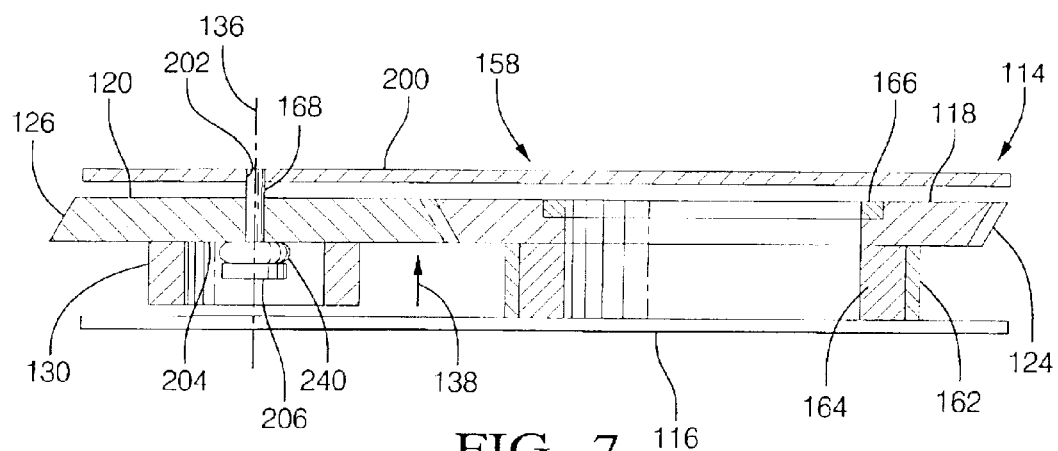
FIG. 7 is a cross section side elevated view of an alternative embodiment of the taper based de-lashing mechanism of FIG. 5.

Referring now to FIG. 7, an alternative embodiment of conical gears 114 is illustrated. More specifically, gear 118 is again fixed vertically with respect to PCB 116 via bearing surfaces at upper portion 158 and lower portion 160 of gear 118. First bearing surface 162 is disposed around hub portion 164 defining lower portion 160. Second bearing surface 166 resides in a cutout in upper portion 158 configured to receive second bearing surface 166.

Conical teeth 124 of gear 118 engage conical teeth 126 of gear 120 biased in a direction indicated by arrow 138. Gear 120 is rotatable and translatable about axis 136 while also being fixed relative thereto. Pin shaft 168 extends axially from top surface 128 of gear 120 to transmit angular movement thereto. Pin shaft 168 is mounted to a housing 200 at one end 202. A spring washer 240 is disposed between a bottom surface 204 of gear 120 and a bearing support 206 extending from pin shaft 168 opposite end 202. Spring washer 240 is configured to bias conical teeth 126 of gear 120 in direction 138 to optimize contact with complementary conical teeth 124 of gear 118. In this manner, lash is reduced between gears 118 and 120 having complementary tapered conical teeth that in effect alter the effective fixed center distance between them by vertical translation of one gear relative to the other without altering the actual fixed center distance defined by each respective rotational axis. Spring washer 240 thus provides a mechanism to bias gear 120 when gear 120 is operably suspended from a top portion thereof.

Although conical gears 114 have been described with reference to a hand-wheel position sensor, the above described embodiments are optionally employed in any enviromnent where a reduction of lash is desirable between a pair of fixed center gears. Backlash still exists within the conical gears 114 described above, but the characteristics of resilient biasing means 144 force conical teeth 126 to maintain contact with conical teeth 124. This type of continuous engagement yields a only about half as much surface-to-surface contact as square edged contact between coplanar gears, thereby resulting in a significant reduction in backlash.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hand-wheel position sensor for a steering system in a vehicle comprising:

a housing;

a printed circuit board disposed within said housing;

a sensor operably connected to circuitry on said printed circuit board;

a gear assembly operably connected to said sensor, comprising, a first gear rotatable about a first axis, said first gear having a first center rotatably fixed to said first axis, said first gear having a first conical teeth portion;

a second gear rotatable about a second axis, said second gear having a second center rotatably fixed to said second axis, said second gear having a second conical teeth portion configured to meshingly engage said first conical teeth portion when said first and second gears are aligned substantially coplanarly; and a biasing means for operably biasing said second conical teeth portion of said second gear against said first conical teeth portion of said first gear to reduce any lash therebetween, and wherein said biasing means is configured to bias said second gear in an axial direction while maintaining a fixed center distance between said first and second axes.

2. The sensor of claim 1, wherein said first axis is fixed and said first gear is rotatably fixed about said fixed first axis such that said first gear is prevented from translation along said fixed first axis.

3. The sensor of claim 1, wherein said second gear is translatable in an axial direction relative to said second axis.

4. The senor of claim 1, wherein said second conical teeth portion is defined by a frustoconical wall defined by a top wall edge and a bottom wall edge, said bottom wall edge defining a bottom perimeter about said second axis larger than a top perimeter defining said top wall edge portion, said biasing means urging said second conical teeth portion in a direction urging said bottom wall edge of said second conical teeth portion toward facing said first conical teeth portion of said first gear.

5. The sensor of claim 4, wherein said biasing means includes a spring washer axially disposed about said second axis, said spring washer configured to bias said bottom wall edge axially about said second axis into meshing engagement with facing first conical teeth portion of said first gear.

6. The sensor of claim 5, wherein said second gear includes a hub portion extending from said bottom wall edge, said spring washer operably applies a compressive force against said hub portion in said direction that urges said bottom wall edge of second conical teeth portion toward facing first conical teeth portion of said first gear.

7. The sensor of claim 6, wherein said hub portion includes a bearing disposed therein, said spring washer applies a compressive force against said bearing in said direction that urges said bottom wall edge of second conical teeth portion toward facing first conical teeth portion of said first gear.

8. The sensor of claim 6, wherein said spring washer includes a substantially flat disk washer configured having at least one resilient biasing member extending radially inwardly from an edge defining an aperture configured in said flat disk washer.

9. The sensor of claim 8, wherein said at least one resilient member includes a prong having a first end extending from said edge of said flat disk washer and a second end operably connected to said bottom wall edge of said second gear, said prong extending from a plane defining a top surface of said disk washer.

10. The sensor of claim 9, wherein said prong includes three equidistant prongs, each of said prongs having said second end connected to one of said hub portion and said bearing.

11. The sensor of claim 10, wherein said first end of said each prong is configured with a cutout on either side of said each prong, said cutout configured to reduce stress associated with bending of said each prong at an interface between said each prong and said edge of said disk washer.

12. The sensor of claim 11, wherein said first and second gears are operably connected to a printed circuit board, said spring washer disposed between said printed circuit board and said second gear.

13. The sensor of claim 12, wherein said printed circuit board is operably supported within a housing.

14. The sensor of claim 8, said resilient member includes at least a hollow first frustocone concentrically connected to a hollow second frustocone by connection of at least one of said top wall edge and said bottom wall edge defining each of said first and second frustocones, said first and second frustocones are contiguous and inverted with respect to each other, contiguous frustocones connected via said top wall edge of one of said first and second frustocones to said bottom wall edge of another contiguous said first and second frustocones.

15. The sensor of claim 1, wherein said second gear includes a pin shaft extending therefrom.

* * * * *